Patented Feb. 6, 1940

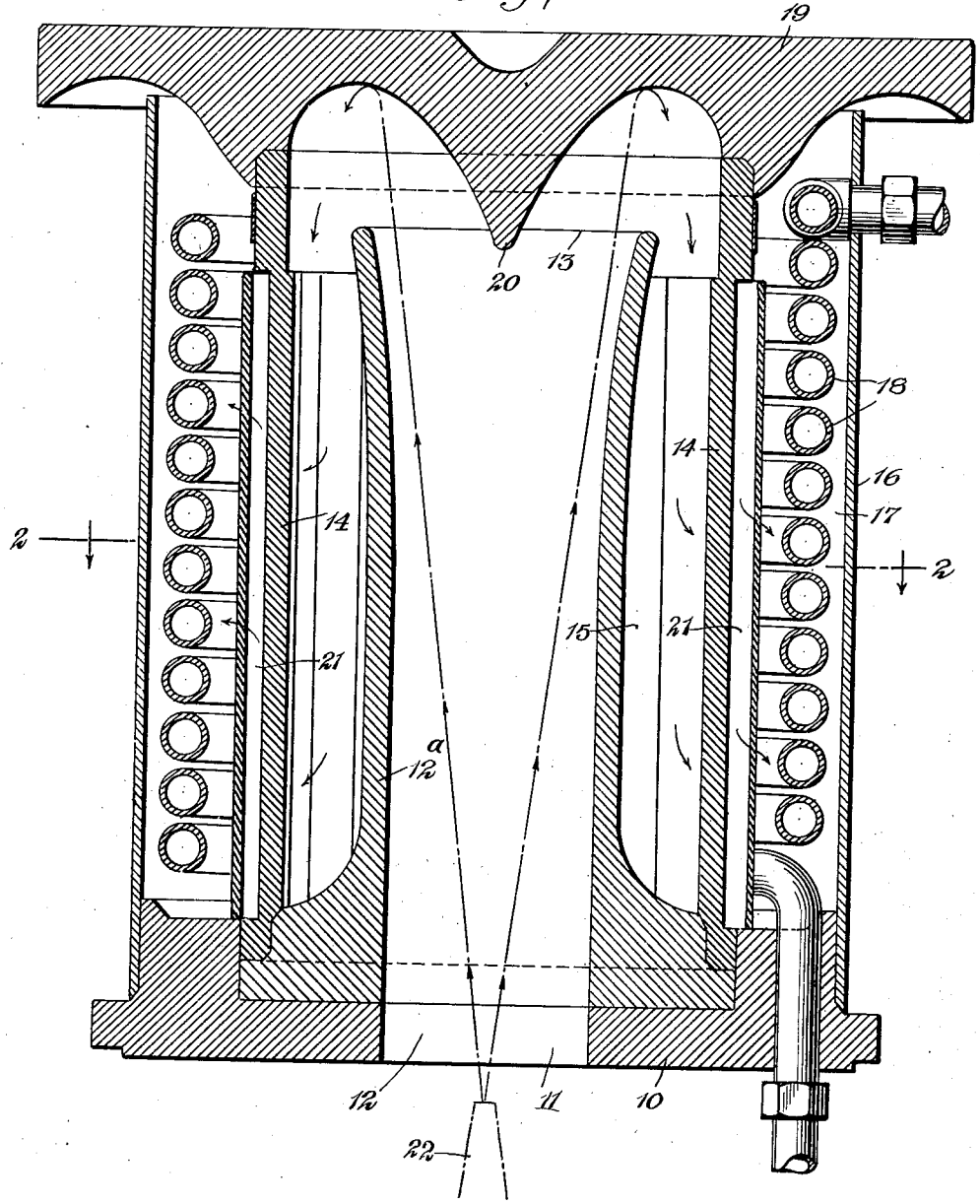

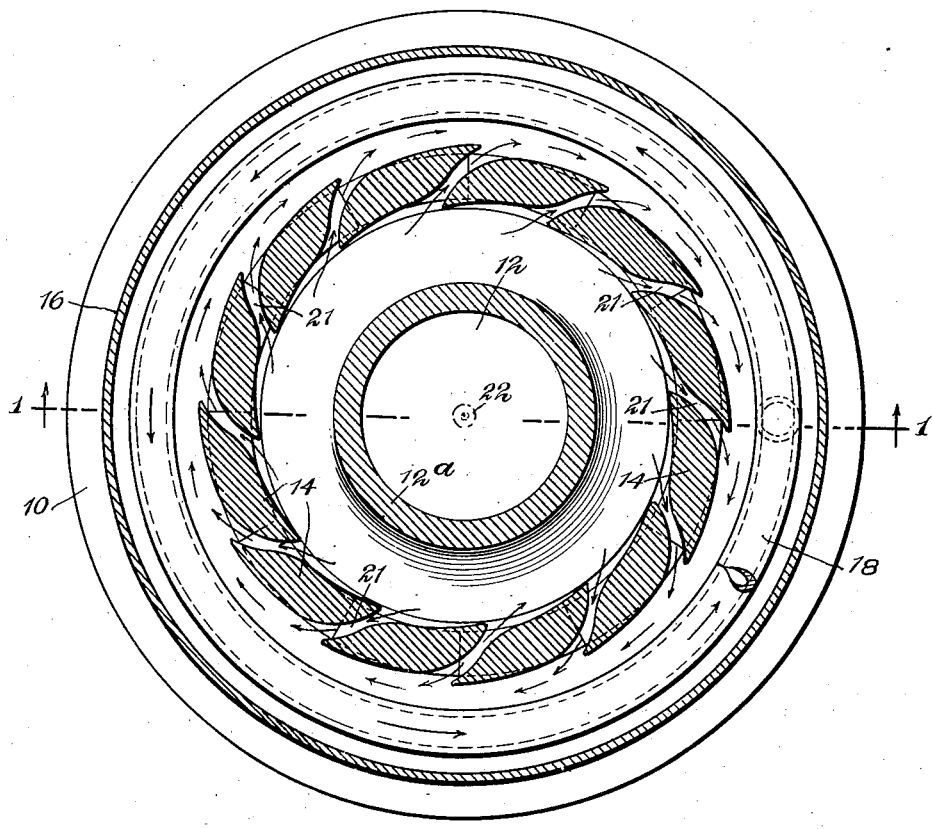

2,189,532

UNITED STATES PATENT OFFICE 2,189,532

HEAT TRANSFER APPARATUS

Thomas N. Garson and Frederick C. Melchior, New York, N. Y.

Application January 27, 1937, Serial No. 122,552

3 Claims. (Cl. 122—250)

This invention relates to heat transfer apparatus, an object of the invention being to provide an apparatus of this character in which gases or products of combustion are compressed in the combustion chamber and discharged from the combustion chamber through Venturi-like openings in the wall thereof into a heat transfer chamber where the heat molecules are caused to whirl with high velocity and great molecular impact.

More specifically, the invention includes a combustion chamber separated from the heat transfer chamber by a wall having Venturi-like openings therein tangentially arranged, said openings constituting expansion nozzles through which the gases from the combustion chambers escape with great velocity and are given a whirling motion, thus converting the potential energy of the compressed gases or products of combustion into kinetic energy, thereby causing hot molecules to whirl with high velocity and great molecular impact against an element to which the heat is transferred.

In the specific construction of apparatus illustrated, the heat receiving element constitutes a coil for the passage of water or other fluid, and the fluid flows through the coil in the heat transfer chamber in a direction opposite to the whirling movement of the gases.

The invention embodies many novel features of construction and combinations and arrangements of parts, all of which will be more fully hereinafter described and pointed out in the claims.

In the accompanying drawings—

Fig. 1 is a view in longitudinal section illustrating a preferred embodiment of our invention, this view being taken on the section line 1—1 of Fig. 2; and Fig. 2 is a view in transverse section on the line 2—2 of Fig. 1.

In the apparatus illustrated, 10 represents a base or end having a central opening 11 therein which registers with a tubular mixing and initial combustion chamber 12 defined by a wall 12a supported in the base and shown here with a flared inner end 13. Around the wall 12a defining the mixing and initial combustion chamber, a wall 14 is located, and the wall 12a and the wall 14 are preferably of cylindrical form so as to provide a final combustion chamber 15 between them. An outer cylindrical wall 16, also supported on the base, is spaced from the wall 14 and constitutes the outer wall of a heat transfer chamber 17 in which a pipe coil 18 is located for the passage of water or other fluid therethrough. An end member 19 is located against the end of the wall 14 and is provided on its inner face with a depending enlargement 20 entering the end of the mixing and initial combustion chamber 12 and constituting a deflector for deflecting the gases over the end of the mixing and initial combustion chamber 12 into the final combustion chamber 15.

The wall 14 is provided with a circular series of openings 21 which are disposed at a tangent, and constitute expansion nozzles of Venturi-like form. These openings or nozzles may be formed either by slots in a solid wall or by members spaced apart and, of course, the invention is not limited in this particular. Furthermore, the invention is not limited to the particular length or shape of these slots or openings but they are illustrated in what is believed a preferable form in that they extend substantially throughout the length of the wall 14.

22 represents a burner nozzle which may constitute an oil burner or any other approved burner, and from this burner the flame and products of combustion are directed through the mixing and initial combustion chamber 12, and from thence into the final combustion chamber 15 where they are compressed and escape through the Venturi-like openings 21 into the heat transfer chamber 17 where they are caused to whirl with high velocity and great molecular impact and move in a direction opposite to the direction of flow of the fluid through the coil 18.

This construction, as above stated, causes the potential energy of the compressed gases or products of combustion to be converted into kinetic energy, thereby causing hot molecules to whirl with high velocity and great molecular impact against an element to which the heat is transferred. This increases the efficiency of the transfer of the heat units from the gases to the fluid in the coil or to any other element in the heat transfer chamber.

Our improved apparatus constitutes in effect a heat booster which includes spaced walls defining a combustion chamber and a heat transfer chamber, the wall between said chambers having openings therein so designed as to create a back pressure on the gases or products of combustion and cause the same to escape through said openings with increased velocity.

While we have illustrated and described what we believe to be a preferred embodiment of our invention, it is obvious that various changes may be made with regard to the form and arrangement of parts without departing from the spirit of our invention, and hence we do not limit ourselves to the precise details set forth but consider ourselves at liberty to make such changes and alterations as fairly fall within the spirit and scope of the claims.

We claim:

1. Heat transfer apparatus comprising a cylindrical wall enclosing a combustion chamber, means disposed around said wall so as to provide a heat transfer chamber between said means and the wall, and heat transfer means disposed in said heat transfer chamber said cylindrical wall being formed with a series of spaced, longitudinally slotted openings extending substantially from end to end thereof to permit the gases and products of combustion to enter the heat transfer chamber from the combustion chamber, and being designed to create a back pressure on the gases and products of combustion in the combustion chamber and to increase their velocity as they enter the heat transfer chamber.

2. Heat transfer apparatus comprising a cylindrical wall enclosing a combustion chamber, means disposed around said wall so as to provide a heat transfer chamber between said means and the wall, and heat transfer means disposed in said heat transfer chamber said cylindrical wall being formed with a series of spaced, longitudinally slotted openings extending substantially from end to end thereof to permit the gases and products of combustion to enter the heat transfer chamber from the combustion chamber, said slotted openings being tangentially disposed and tapering from the inner surface of the wall towards the center thereof and expanding from the center towards the outer surface of the wall so as to create a back pressure on the gases and products of combustion in the combustion chamber and to increase their velocity as they enter the heat transfer chamber.

3. Heat transfer apparatus comprising a cylindrical wall enclosing a combustion chamber, means disposed around said wall so as to provide a heat transfer chamber between said means and the wall and heat transfer means disposed in said chamber, said cylindrical wall comprising a series of spaced longitudinally extending members arranged in cylindrical form and having elongated Venturi-like slotted openings therebetween extending longitudinally of the wall substantially from end to end thereof, said openings permitting the gases and products of combustion to enter the heat transfer chamber from the combustion chamber and being designed to create back pressure on the gases and products of combustion in the combustion chamber and to increase their velocity as they enter the heat transfer chamber.

THOMAS N. GARSON.
FREDERICK C. MELCHIOR.